June 22, 1965  H. E. LUSTIG ETAL  3,191,170
CONTOUR MAPPING SYSTEM
Filed Jan. 7, 1963  8 Sheets-Sheet 1

INVENTORS
HOWARD E. LUSTIG
ARTHUR L. ROSSOFF
BY
James and Franklin
ATTORNEYS

INVENTORS
HOWARD E. LUSTIG
ARTHUR L. ROSSOFF
BY
ATTORNEYS

June 22, 1965  H. E. LUSTIG ETAL  3,191,170
CONTOUR MAPPING SYSTEM
Filed Jan. 7, 1963  8 Sheets-Sheet 4

INVENTORS
HOWARD E. LUSTIG
ARTHUR L. ROSSOFF
BY
ATTORNEYS

INVENTORS
HOWARD E. LUSTIG
ARTHUR L. ROSSOFF
BY
ATTORNEYS

INVENTORS
HOWARD E. LUSTIG
ARTHUR L. ROSSOFF
BY
ATTORNEYS

United States Patent Office 3,191,170
Patented June 22, 1965

3,191,170
CONTOUR MAPPING SYSTEM
Howard E. Lustig, Flushing, and Arthur L. Rossoff, Huntington Station, N.Y., assignors to General Instrument Corporation, Newark, N.J., a corporation of New Jersey
Filed Jan. 7, 1963, Ser. No. 249,944
36 Claims. (Cl. 343—5)

This application is a continuation-in-part of our prior application Serial No. 165,064, filed January 4, 1962, having the same title, and assigned to the assignee of this application.

The present invention relates to a system for the direct production of a contour map representation of terrain, with or without other mapping representations thereof, and is of special utility in connection with the formation of such a contour map representation from a mapping station which moves over the terrain to be mapped at an elevated position relative thereto and scans successive sections of the terrain through a reflected radiation method. A typical such reflected radiation method involves the use of radar, and the invention is here specifically disclosed in conjunction with an airborne radar mapping operation, but the invention is not specifically limited thereto. Purely by way of example, it is equally applicable to a ship-borne sound ranging method for mapping of the ocean bottom.

The only existing airborne technique for the production of precise maps of non-level terrain is based on aerial photography. With this technique, successive overlapping photographs are taken. Subsequently, terrain features are properly located and elevation contours are generated by stereographic plotting. This technique is capable of producing excellent maps but has the following inherent disadvantages: (1) Aerial photographs may be obtained only in daylight and under clear weather conditions. (2) The stereographic plotting process must be performed on the ground and involves a laborious, time-consuming procedure. (3) The elevation of a point on the ground may only be determined if it has definable detail. For example, a surface covered with a continuous blanket of snow may not be located in elevation. This complicates the mapping of regions like Antarctica.

It is also possible to produce maps with existing side-looking radar systems that are capable of fairly high resolution. Such missions are not limited to high visibility conditions. However, this technique introduces an inherent distortion in target location when the terrain is not flat; points on mountains appear to be closer to the aircraft than they actually are and, conversely, points of low altitude appear to be farther away. This type of distortion may be grossly misleading for mountainous terrain. Furthermore, radar maps of this type are totally incapable of yielding terrain elevation information.

By comparison, the system of the present invention offers the following features:

(1) Most significantly, it permits the direct production of a contour map representation of considerable accuracy.

(2) It has the inherent advantage of a radar system over a photographic system in that mapping missions need not be performed under conditions of high visibility.

(3) The contour map (and intensity map if desired) are generated automatically and require no processing other than the film development. The film record is available shortly after completion of the aerial mission or may, in fact, be provided during the flight; rapid processing and telemetry permit immediate data utilization by flight and ground personnel, respectively.

(4) It is capable of mapping the elevation contours of an area such as Antarctica, having little distinguishable surface detail.

(5) It is not subject to the distortions inherent in conventional radar mapping. All points on the terrain, whatever their elevation, are correctly located by true vertical projections onto a horizontal reference plane.

(6) Its stabilization system is more effective than any system presently incorporated in a strip mapping device.

In accordance with the present invention the mapping station, which may be defined by a radar-carrying aircraft, is provided with radar which scans successive strips of the terrain beneath the aircraft as the aircraft moves thereover, that scanning preferably being by means of a narrow pencil beam scanning through a vertical plane perpendicular to the aircraft heading. As a consequence, every complete scan illuminates a thin strip of terrain which is also perpendicular to the aircraft heading and which extends continuously from one side of the aircraft to the other, including the region directly below the aircraft. If every scan is accomplished in one direction (e.g., left to right) with a rapid flyback, and if the scan rate is such that one scan is completed in no more time than it takes the aircraft to travel a distance equal to that subtended by the beam width on the ground, then complete illumination coverage of the terrain is accomplished.

Simultaneous with the antenna scan, a cathode ray tube display is generated which reproduces the profile of the scanned strip of terrain, and from this profile display a series of indications are produced representing the lateral displacement positions of points on that terrain corresponding to predetermined elevations of the terrain above a reference plane such as sea level. These indications are photographed on film moving at a speed synchronized with the aircraft's ground speed. As a result, there is produced directly on this film a series of contour lines representing the lateral location of points on the mapped terrain corresponding to the predetermined elevation values. In its preferred form as here shown, these contour lines are appropriately distinctively coded, preferably in a visual manner, in order to facilitate interpretation of the thus-produced contour representation, in this way permitting one to readily distinguish between a hill, the elevation of which increases, and a valley, the elevation of which decreases.

Optionally, a second cathode ray tube display may be generated and photographed, preferably by the same camera, this display showing each elemental ground target at its true lateral displacement ground position, independent of its height, and also, if desired, indicating the character of each elemental ground target in terms of its ability to reflect the radiations emanating from the mapping station.

In addition, means of stabilization and correction are provided so that departures of the aircraft movement—course, altitude, heading and attitude—from a predetermined norm result in appropriate corrections to the display, thereby preventing or minimizing distortion in the ground map produced.

To the accomplishment of the above, and to such other objects as may hereinafter appear, the present invention relates to a contour mapping system as defined in the appended claims and as described in this specification, taken together with the accompanying drawings, in which:

Figure 3:
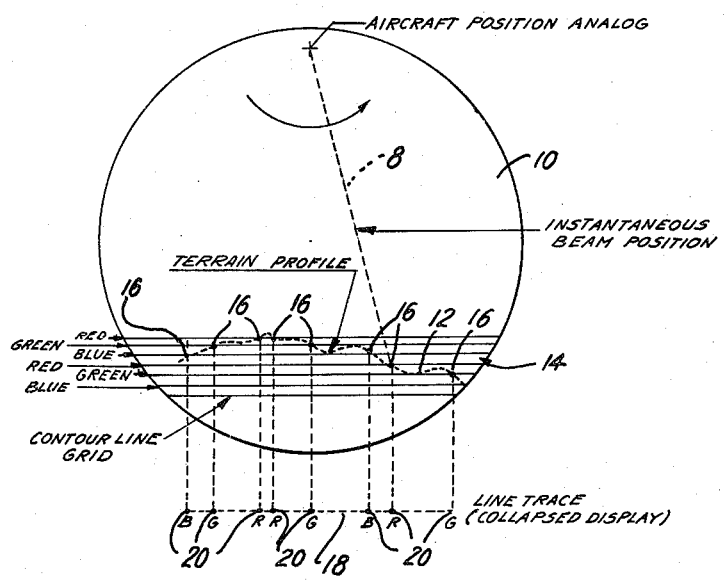
FIG. 3 is a diagrammatic representation of the screen of a cathode ray tube on which a representation of the terrain profile is produced, and further illustrating the manner in which that profile representation is transformed by a mask into a series of individual visible points representing preselected elevational levels.
Figure 6:
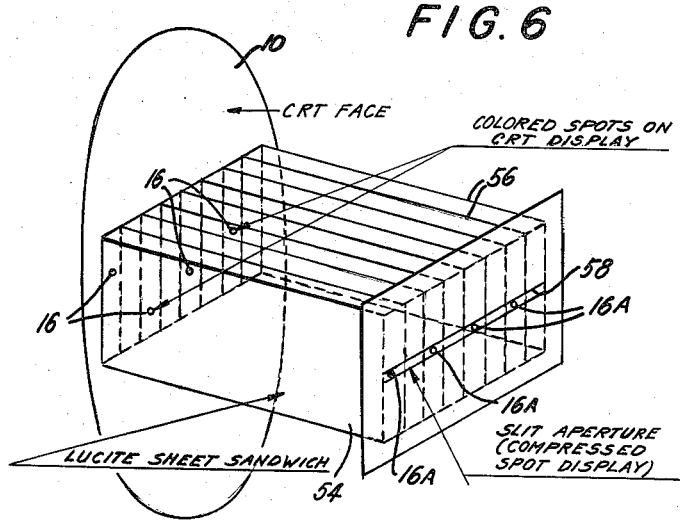
Figure 7:
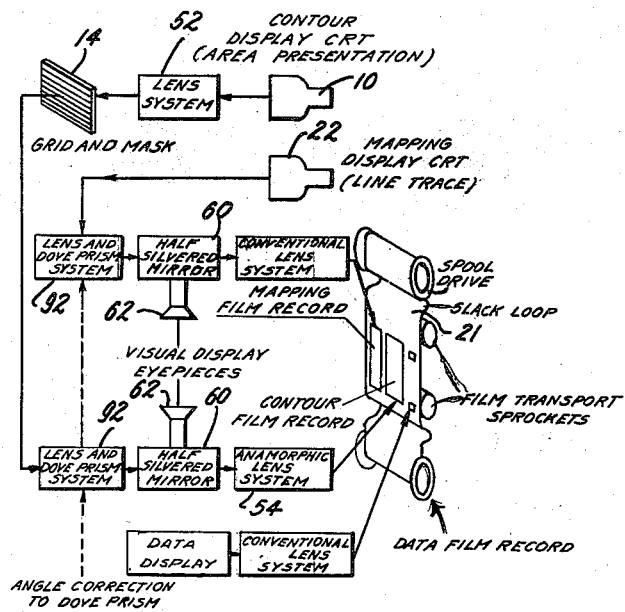
Figure 9:
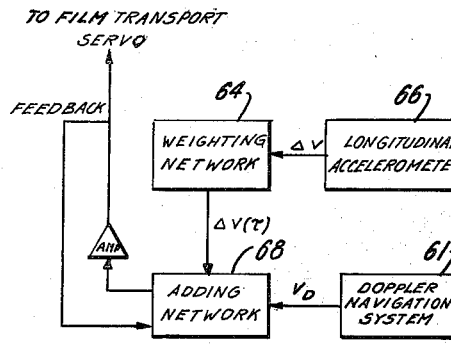
Figure 10:
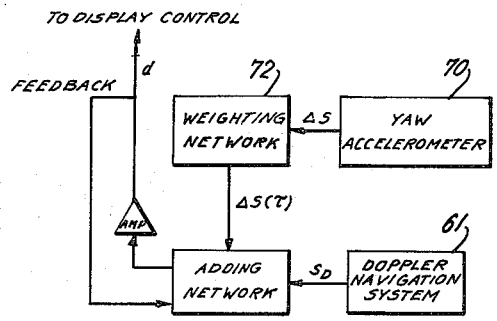
Figure 8:
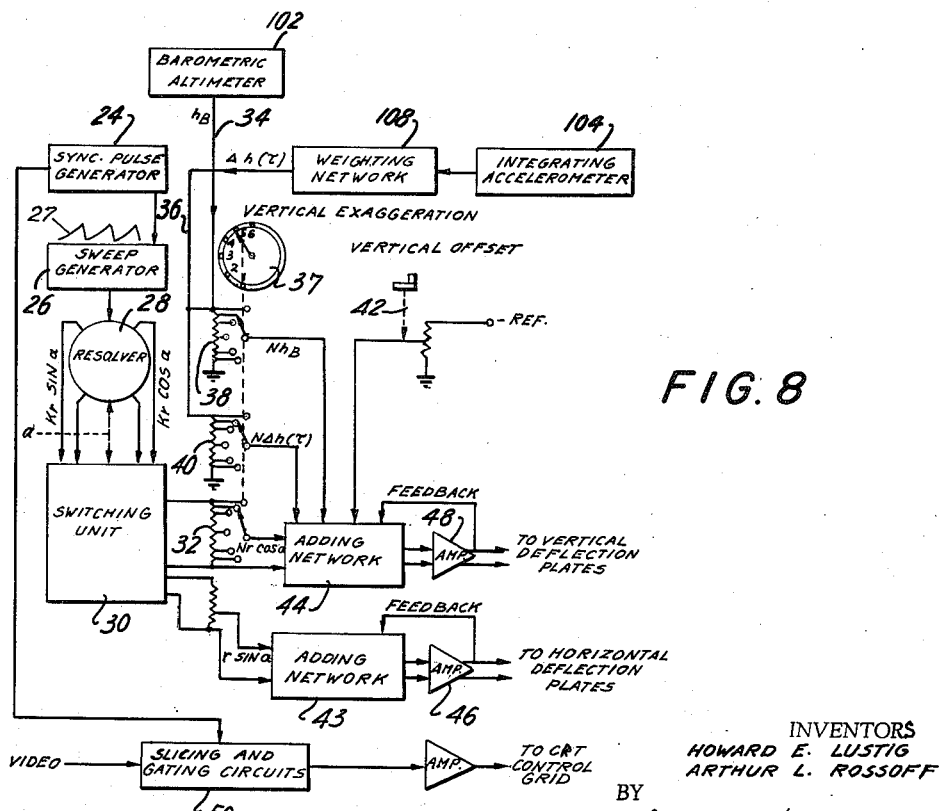
Figure 11:
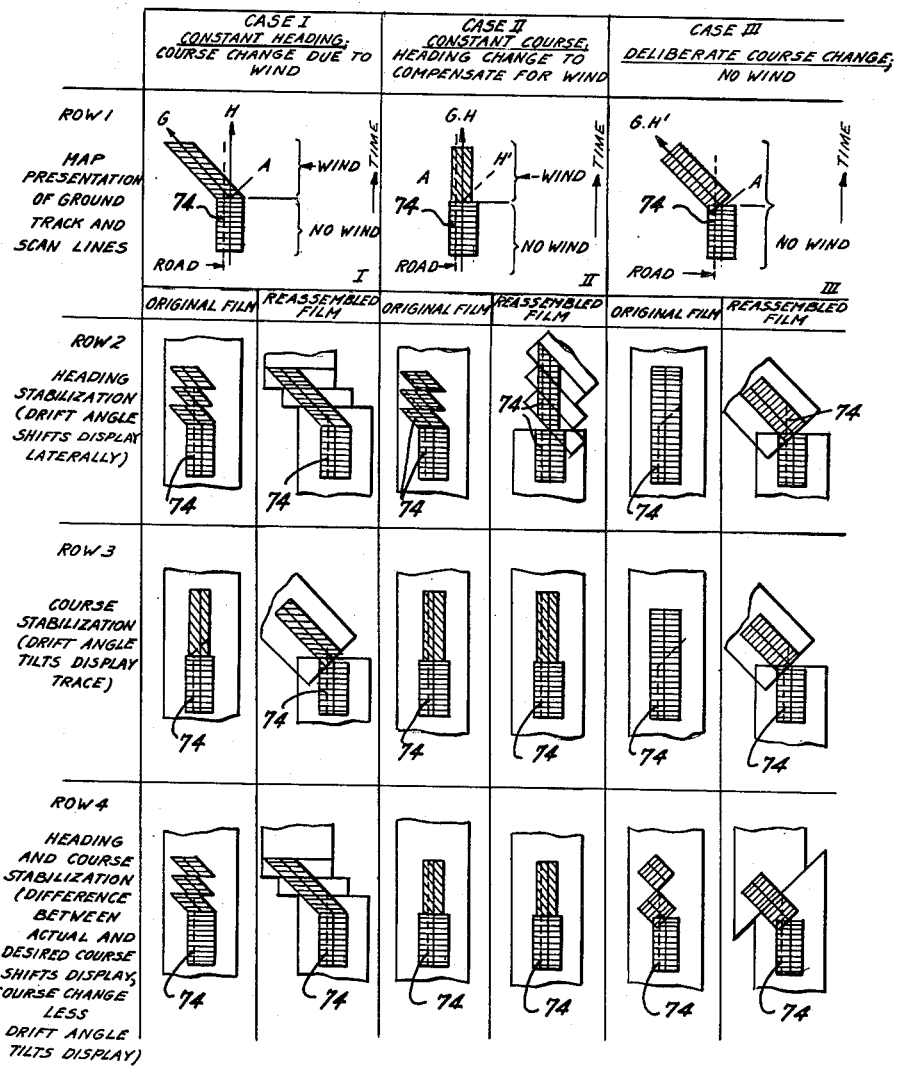
Figure 12:
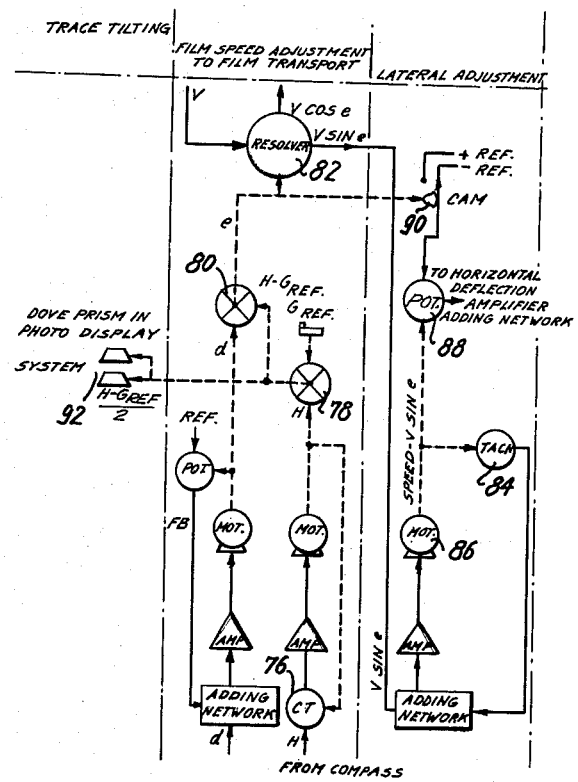
Figure 13:
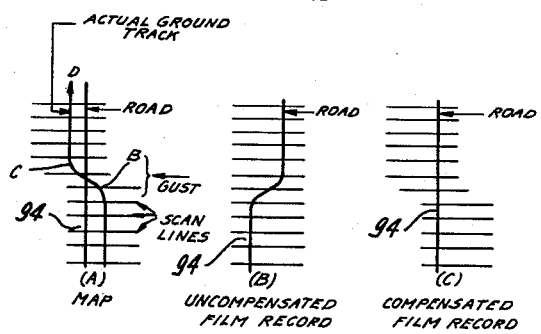
Figure 14:
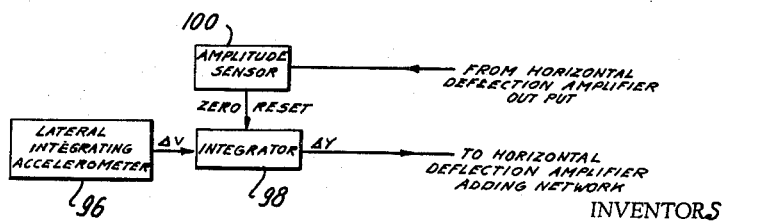
Figure 15:
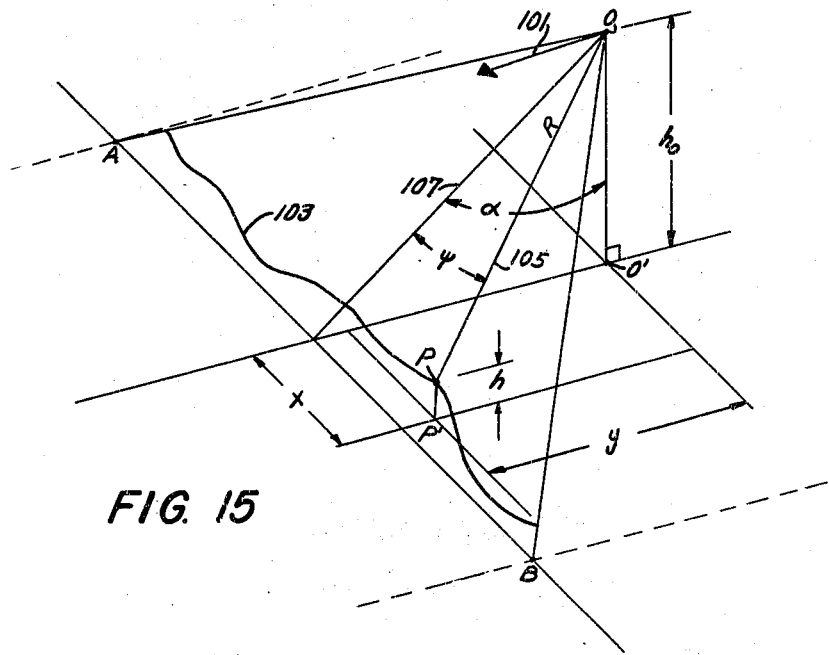
Figure 16:
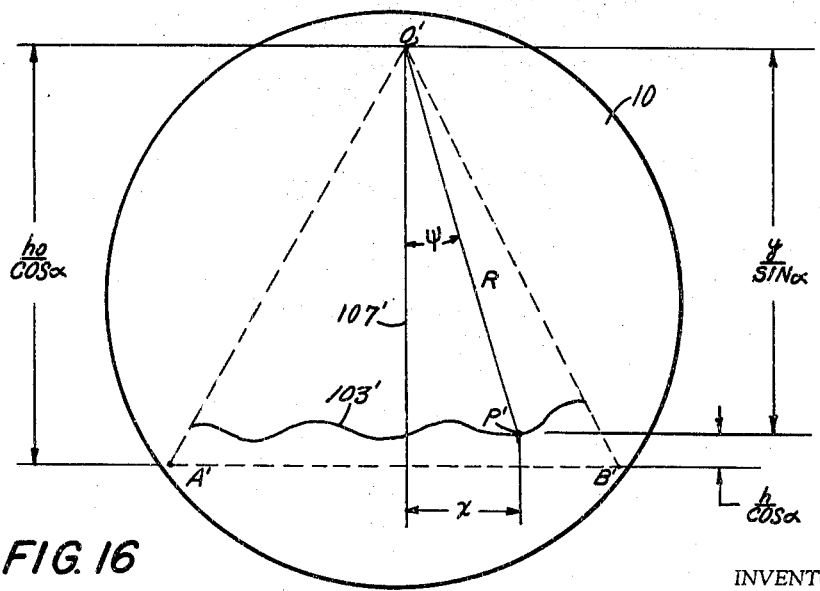
Figure 17:
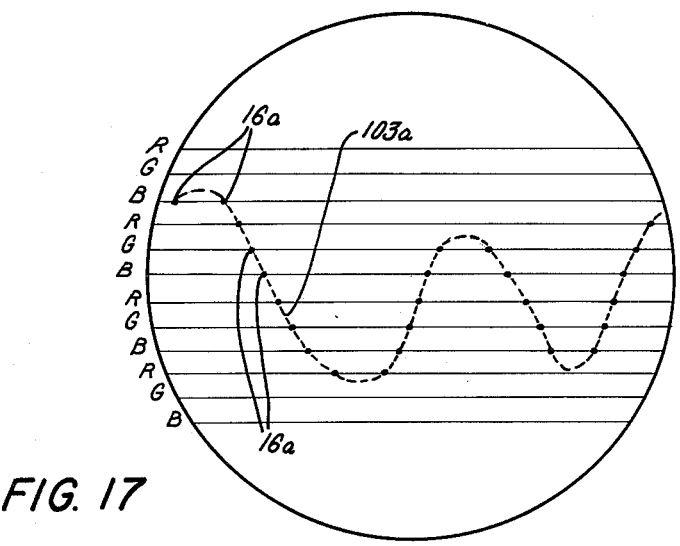
Figure 18:
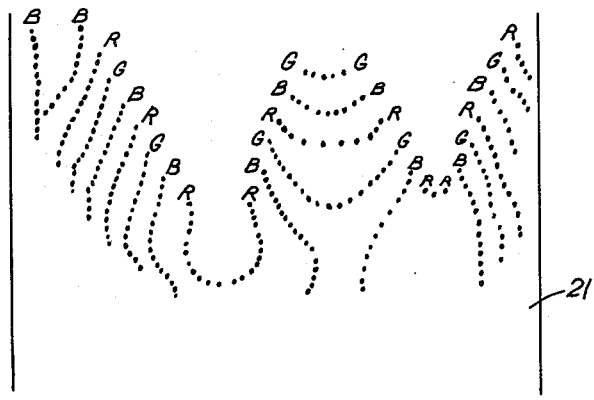

FIGS. 5C and D are similar to FIG. 5A but illustrate the scanning of valleys of two different configurations;

FIG. 6 schematically illustrates one way in which the individual visible indications from the cathode ray tube of FIG. 3 may be optically vertically collapsed in order to produce the contour line representation in a substantially straight line trace;

FIG. 7 is a schematic view of a preferred embodiment of the system for creating and photographing both a contour map representation and a strip map representation embodying the terrain intelligence record;

FIG. 8 is a schematic view of a part of a system for controlling and correcting the contour display;

FIG. 9 is a schematic representation of a part of a control system for governing the speed of movement of the film;

FIG. 10 is a schematic representation of a control system for deriving a signal for controlling the display in accordance with drift of the aircraft;

FIG. 11 is a diagram showing different ways in which compensation for changes in aircraft heading and course may be accomplished and illustrating in Row 4 a preferred method thereof;

FIG. 12 is a schematic representation of a control system for accomplishing the corrections shown in Row 4 of FIG. 11;

FIG. 13 is a diagrammatic representation illustrating the need for making corrections in the display to compensate for lateral movement of the aircraft;

FIG. 14 is a diagrammatic representation of a control system for accomplishing the corrections indicated in FIG. 13;

FIG. 15 is a diagrammatic representation of an alternative type of scanning in which the scanning plane is inclined with reference to the vertical;

FIG. 16 is a diagrammatic representation of the screen of a cathode ray tube used with the scan system of FIG. 15;

FIG. 17 is a semi-pictorial representation of the cathode ray tube screen of FIG. 16 on which a representation of a typical terrain profile is produced, and illustrating the manner in which that profile representation is formed by a mask into a series of individual points representing preselected elevational levels; and FIG. 18 is a pictorial representation of the type of contour lines produced by the system of FIGS. 15–17.

GENERAL DESCRIPTION

As here specifically disclosed, the system begins with a radar and a scanning antenna of narrow beam width. The beam may be generated with a single pencil beam antenna array which serves both the functions of transmission and reception. Alternatively, an effective pencil beam may be obtained at the intersection of two crossed fan beams. Thus a conventional side looking radar antenna can serve as a fan beam transmitter, while a scanning receiving array samples the illuminated terrain with another, but perpendicularly arranged, fan beam.

In any event, the resulting actual or effective pencil beam is caused to scan in a given plane. That plane may be vertical, as in FIGS. 1–2, or inclined relative to the vertical as in FIGS. 15–17. In either case the scan tentatively encompasses a field 45° on either side of the midpoint or vertical, or 90° total. The wavelength of the radiations may be in the vicinity of 1 cm. by way of example. The minimum antenna scan and pulse repetition rates are governed by the aircraft velocity to height ratio, in accordance with well known principles.

Figure 1:
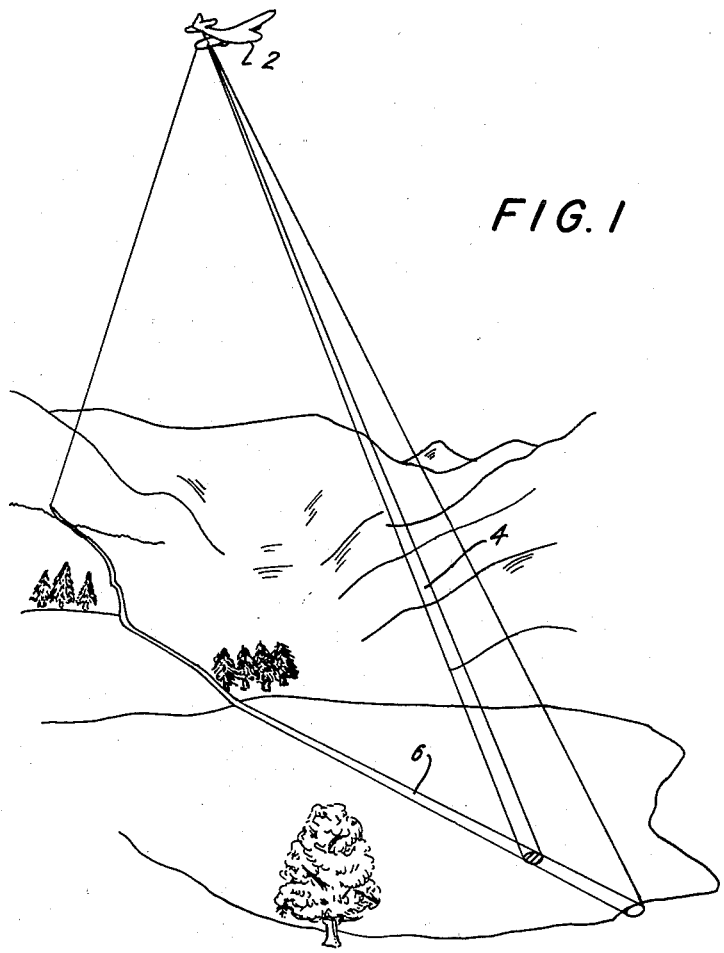
FIG. 1 is a semi-pictorial view illustrating an airborne mapping operation.
Figure 2:
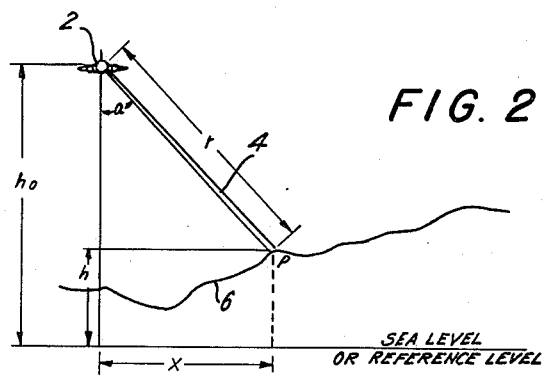
FIG. 2 is a diagrammatic representation of the instantaneous detection, by reflected radiation, of the vertical and lateral position of a given point P on the terrain being mapped.

This may be seen in FIGS. 1 and 2, relating to the scan in a vertical plane, where an aircraft 2 carries a radar installation the narrow beam of which is designated 4, and which scans successive narrow strips 6 of the terrain over which the aircraft flies. At a given instant, when the beam 4 is inclined by the angle $a$ to the vertical, we intercept the target P.

The true position of P, projected vertically into the ground plane, is given by $$x = r \sin a$$

Similarly, the height of the target above the reference level is defined by $$h = h_0 - r \cos a$$

But $r$, the slant range, is known as $\frac{1}{2}ct$, where $c$ is the speed of light and $t$ is the round trip delay of the echo pulse. Therefore the target position and elevation can be expressed as $$x = \tfrac{1}{2}ct \sin a$$
$$h = h_0 - \tfrac{1}{2}ct \cos a$$

Thus, knowing the height, $h_0$, of the aircraft above sea (or reference) level (from compensated barometric altimeter data), and knowing the instantaneous direction of the beam 4, we may determine $x$ and $h$ explicitly and simply from the return time of the illuminated element of terrain.

The video output of the radar receiver, a sync pulse coincident with the transmitted pulse, and antenna position signals are delivered to the display system. Here, the video is processed and the primary scope deflection signals are generated. The cathode ray tube displays from which the maps are derived and photographed results therefrom.

To form the contour map display the direction of the scanning pencil beam 4 is synchronizingly reproduced in the direction of a radial sweep active on the screen 10 of a cathode ray tube (see FIG. 3). As the terrain is scanned, an echo pulse is returned for each transmitted pulse and appears as a luminous spot at a point given by the direction of the sweep 8 and by the round trip time of the return. The pulse repetition rate is such that the individual spots trace what is essentially a continuous curve or display image 12 describing the terrain profile. By use of level slicing techniques, the curve 12 is caused to be uniform in intensity, regardless of the variations in the radar reflectivity of the ground.

Overlying the face 10 of the tube is an opaque mask 14 having fine, uniformly spaced horizontal lines which are transparent and in color, here shown as alternating red, green and blue, or in different shades of gray. These correspond to preselected topographical contour intervals. In the drawings these transparent lines of the mask 14 are shown as solid lines. As the display image 12 crosses a particular mask line, the point of intersection 16 becomes luminous in the color of that line. This generates a single point of a contour line.

Figure 4:
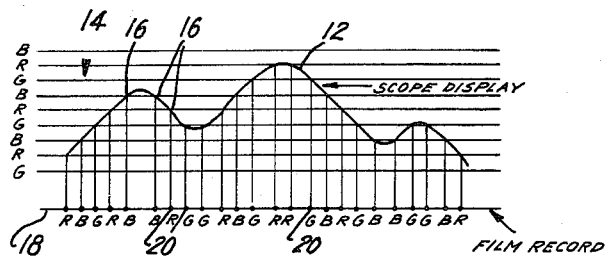
FIG. 4 is a diagrammatic view showing in somewhat more detail, the manner in which a profile representation is transformed into a series of individual visible points representing preselected elevational levels.

The terrain profile display, as viewed through the mask M, is then collapsed into a straight line trace, made up of the individual points of intersection 16 between the display image 12 and the mask lines, with each visible element of the profile projected vertically with its color or gray shade preserved (see the line 18 in FIGS. 3–5), and the points 20 on that straight line trace are photographed. Since the film 21 is transported at a rate related to the ground speed of the aircraft, the succession of line traces generates an essentially continuous contour map on the film. Points of a given color or gray shade them generate continuous curves which are the desired contour lines. (See FIG. 5.)

A second cathode ray tube 22 (see FIG. 7) may be used to obtain the terrain intelligence record. The arrangement here may be similar to that just described, except that no level slicing is employed on the video signals (thus assuring that the intensity of each spot conforms to the terrain radar reflectivity), no line overlay is needed, and vertical collapsing may be obtained simply by setting the vertical deflection voltage at zero. The succession of resulting line traces, which may be recorded on the identical film strip 21 used for contour map generation, constitutes the radar map of the terrain which discloses intelligence by intensity variations and which is distinguished from conventional radar strip maps by the fact that all targets appear at their topographically correct map locations, i.e., at locations defined by vertical projection of each target onto a horizontal reference plane.

The elements of the system thus far described are sufficient to provide inherently distortionless mapping when the aircraft travels a completely true course with no variations in heading, altitude, speed, etc. Since any practical mission must anticipate such variations, then, if no map distortion is to result, means must be provided to sense them and to generate secondary deflection signals or to make use of other accommodating techniques. In a sense, we must accomplish a "stabilization" of the antenna so hat it "flies" a true course in the presence of perturbations of the vehicle.

A necessary accessory to any aerial strip-mapping operation must be a system of navigation, either Doppler, inertial, or both, and including such sensors as a barometric altimeter, vertical gyros, etc. We therefore assume that the vehicle will be equipped with such instrumentation and propose to make use of the outputs required for the antenna "stabilization."

Since present day instrumentation does not give instantaneously accurate information, a preferred way to accomplish the several corrections is to utilize complementary sensor pairs. Thus sensors exhibiting long term stability and accuracy, but relatively insensitive to instantaneous and rapid changes, have their outputs combined in a time-weighted manner with those of sensors of lesser stability which do, however, respond to the instantaneous changes. Combined sensor pair outputs then provide informaton which is both accurate and reacts to instantaneous disturbances. (See FIGS. 8, 9 and 10.)

For variations in ground speed, the drift and yaw-resolved output of the Doppler navigator, corrected for instantaneous longitudinal speed changes by an accelerometer, will be used to control the film transport speed. (See FIG. 9.)

For lateral departures from course, we require a signal resulting in a corresponding lateral displacement of the trace on the display. For this we obtain a signal from the Doppler navigator, augmented by an inertially derived signal to accommodate rapid variations. (See FIGS. 13 and 14.)

To accommodate drift angle, we derive a combined signal from the Doppler navigator and a yaw accelerometer. This will be used to twist the trace until it is perpendicular to the aircraft's actual heading, rather than to its ground course. (See FIGS. 10, 11 and 12.)

To accommodate a variation in altitude, we obtain a signal from the barometric altimeter. To this we add the integrated output of a vertical accelerometer to handle rapid variations. The total data is then applied to the display so as to adjust the height of the origin of the scan to conform to the actual height. (See FIG. 8.)

To accommodate roll, the output of the vertical gyro results in a corresponding rotation of the scan about its origin.

To accommodate pitch, vertical gyro data is again used, this time to adjust the instantaneous film speed as well as the apparent altitude of the aircraft.

CONTOUR GENERATION AND INTENSITY MAPPING

It is preferred that the display image 12 be formed by electrostatic deflection in accordance with the system disclosed in FIG. 8. There the sync pulse generator 24 of the radar periodically actuates a sweep generator 26 to produce a sawtooth voltage 27 that rises linearly with time.

The sawtooth voltage 27 is applied to an electromechanical resolver 28 whose mechanical input, $a$, is synchronized with the instantaneous direction of the radar pencil beam 4. The resolver outputs are then $kr \cos a$ and $kr \sin a$, respectively. These two signals are passed through a switching unit 30. One of the outputs from the switching unit, $kr \sin a$, is amplified and applied as the horizontal deflection voltage.

The vertical deflection voltage is derived by the summation of several independent signals. First of all, the other output of the switching unit 30, $kr \cos a$, is modified by means of a step attenuator 32 to give a signal which will be weighted by the adding amplifier as $nr \cos a$, where $n$ ranges from 1 to perhaps 6, and represents the vertical exaggeration factor to be applied to the elevation display.

In order that each contour line may be given a discrete and invariant meaning, it is necessary to introduce the aircraft altitude above $h_{ref}$ as an input to the vertical deflection channel. For reasons discussed subsequently, this altitude information is derived from two separate channels, 34 and 36. The weighting factor $n$ must be applied to these two signals in order to preserve the desired exaggeration and the contour line invariance. FIGURE 8 shows a 6-position switch 37 which simultaneously introduces the vertical exaggeration to the two altitude channels 34 and 36 at 38 and 40 respectively, as well as to the range-cosine function at 32. In addition to these inputs, a vertical offset 42 is also introduced into the adding network 44. The vertical offset 42 permits placement of a contour anywhere along the vertical direction. In a typical operation, the observer will adjust the vertical offset control 42 until the contour profile appears approximately in the center of the CRT. He will then adjust vertical exaggeration by switch 37 so that most of the useful display surface will be utilized.

The vertical and horizontal deflection signals, after passing through their respective adding networks, are amplified and applied to the deflection plates. High gain amplifiers 46 and 48, utilizing feedback into their respective adding networks 43 and 44, assure stability of the entire display.

The deflection circuits discussed so far, as previously mentioned, serve to position a spot on the face 10 of the scope but do not actually paint it unless a suitable signal is applied to the cathode ray tube control grid. Thus, as the sweep generator 26 progresses in its output from a range of 0 to a maximum range, the beam is always ready in position to paint a spot if a return is actually received at any given range. In order to effect the grid control, the slicing and gating circuits 50 shown at the bottom of FIGURE 8 are utilized. The video signal which, in addition to the desired signal return, contains noise and the sync pulses, is passed through a leveler slicer. The output of the level slicer eliminates the noise, passes the sharp sync pulses, and gives a uniform level target return output for a duration somewhat in excess of T where T is the length of the transmitted pulse. This signal is applied to gating circuits which eliminate the sync pulses and shorten the target return pulses. After amplification, these shortened pulses are applied to the cathode ray tube control grid. Thus, whenever a target return is received, a uniform pulse is applied to the control grid and the electron beam, which has already been tentatively placed in the proper position on the scope face, is finally caused to display the return.

The method just described results in the painting of each spot at a range corresponding to the minimum aircraft to target range that is found anywhere within the intersection of the antenna beam 4 with the terrain. If desired, additional differentiating and gating circuits can be incorporated so that the indicated range corresponds, instead, to the average aircraft to terrain range encompassed by the antenna beam width.

If the spot thus created with either method falls on one of the translucent or transparent colored grid lines of the mask 14, this indicates that the return is derived from a target whose elevation coincides with one of the contour lines and results in the photographing of this information. If the spot falls between grid lines, on the other hand, the mask 14 prevents its transmission to the photographic record. In this manner, only returns corresponding to the selected increments are photographed.

Some means of contour line identification should be provided to facilitate interpretation of the produced contour map representation. It has been mentioned already that three different colors (or three different shades of the same color) may be used for the grid lines. The use of three colors assures proper identification of contours in designating increasing elevations as opposed to those indicating falling terrain. Thus, if the colors are designated by A, B and C, a contour sequence of any two items in the series

Figure 5:
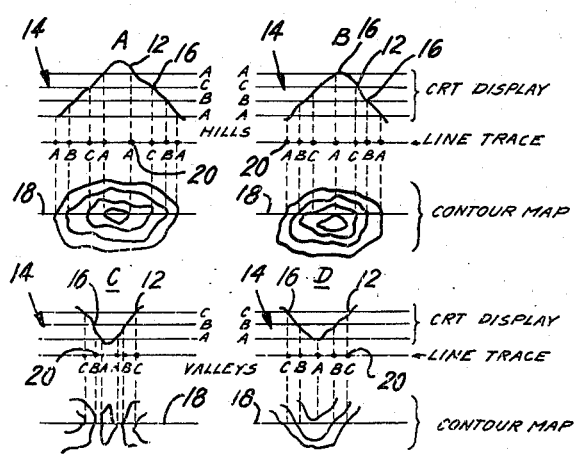
FIG. 5A illustrates the type of contour lines produced by the system of the present invention while scanning a hill having a particular profile.
FIG. 5B is similar to FIG. 5A but shows the scanning of a hill with a different profile.

A—B—C—A may indicate rising terrain while two successive members of the sequence C–B–A–C indicate a descending elevation. Some of these conditions are shown in FIGURE 5. It may be noted that in any change from an ascent to a descent, or vice versa, the same contour must be crossed twice or, in the limiting case, once; thus the series ABCAACBA and the series ABCACBA (FIGURES 5A and 5B) both indicate a hill; the series CBAABC and CBABC (FIGURES 5C and 5D) both indicate valleys. Multiple crossings of the same contour are frequently encountered. These provide clues with respect to the terrain shape between crossings. The only possible confusion arising from the three color system may be found for special situations such as overhanging cliffs. Encounter of these situations is, however, considered extremely unlikely and may, for all practical purposes, be ignored.

It is thus seen that the sequence of the colors appearing along any direction on the contour map record gives an essentially unique identification of the terrain hypsography. What is missing at this point, however, is the unique assignment of an absolute value to at least one of the contour lines with respect to a reference altitude. Several methods for designating absolute values are feasible. One may, for example, photograph, along with contour and intensity data, a record of essential information for subsequent analysis purposes. Thus the flight number, mission number, geographic location as derived from a navigation system, wind information, etc. are assumed to be available from a readout system. This readout is photographed at periodic intervals and is recorded on the same film strip as the contour and intensity information. It is proposed to record, as part of this data, both the aircraft altitude above reference and the terrain clearance to a point directly below the aircraft. By observing this information at intervals, and indicating on the film the point at which the information was taken, it is always possible to obtain the altitude of the point directly below the aircraft at that time. This permits identification of the contour lines nearest to this point and hence establishes an absolute elevation reference for the entire contour map.

In order to form the contour map representation the varioust illuminated points 16 visible through the mask 14 are converted or "collapsed" to a substantially straight line trace 18 before they are photographed. This can readily be accomplished optically by means of an anamorphic optical system 54, one which produces unequal magnification in two mutually perpendicular directions. Perhaps the most simple anamorphic lens system is one that utilizes a single cylindrical lens. Such a lens has a focal line, as opposed to the focal point of a conventional lens. For the present application, a cylindrical lens would be placed in front of the mask 14 with the focal line parallel to the grid lines. The recording film 21 would be placed in the plane of the focal line. Collimation, however, requires additional optics. In the absence of such optics, points 16 would become smeared on the film record 21.

One simple method of overcoming this effect consists of using a "sandwich" of thin Lucite sheets 56 in conjunction with a slit aperture as shown in FIGURE 6. The stack of Lucite sheet 56 is placed in front of the tube face 10 so that the sheet planes lie in the vertical display direction. The highly polished surfaces between adjoining sheets prevent light from going from one sheet to another and thus ensure preservation of the horizontal display dimension on the film record. Vertical compression is achieved by means of the slit aperture 58. Regardless of the vertical position of a spot on the tube face 10, some light will pass from the tube face 10 through the appropriate Lucite sheet 56 and then through the aperture slit 58 on to the recording film 21 which is placed directly in front of the slit.

It may be desired to also produce a radar strip map showing the actual terrain returns in their proper intensity relationships. This radar map should also preserve the proper placement of targets in terms of where they would appear on a topographic map. Such a map could be generated through a separate display of returns with a system identical to that described except for the absence of grid lines and the elimination of the level slicing and gating circuitry discussed above. The radar map could also be generated with the system already described by eliminating the mask between grid lines and eliminating the level slicing and gating networks only. In this manner the display would contain both intensity information from the targets themselves as well as the contour lines. The display would suffer from the fact, however, that such grid lines as are displayed would not be of uniform intensity but would rather have an intensity depending on the target return. In the absence of strong returns, therefore, no grid lines would be recorded at all. It is for this reason that a system utilizing separate displays for contour and intensity information, respectively, is preferred, and is shown in FIG. 7, utilizing the cathode ray tube 22. A horizontal deflection voltage proportional to $r \sin a$ is taken from the output of the adding network 43 in FIG. 8 and requires no duplication of circuitry. No vertical deflection is applied to tube 22. Radar video information is applied directly to the control grid. As a result, a single line trace is generated whose position on the face of the scope always corresponds to the correct (vertically projected) target location on a topographic map and whose intensity is proportional to the target return.

The two displays thus generated by tubes 10 and 22 may or may not be combined onto a single photographic record 21. Thus, for certain applications, it may be desirable to have separate contour records, uncluttered by other information, which may perhaps be superimposed on aerial photographs or reconnaissance records obtained with another sensor. Similarly a radar intensity record only, with no contour lines, is useful for other intelligence extraction processes. Still other applications may make it desirable to superimpose the contour and intensity data. It is proposed, in any event, to place both types of information on a single film strip so that continuous correspondence between the two records is automatically assured. If desired, the optics may be designed so that the records appear not only on a single film strip, but superimposed as well, rather than side-by-side.

If visual observation of the displays is desired, the contour display being viewed prior to its compression into the line trace 18, conventional half-silvered mirrors 60 provided with eyepieces 62 may be incorporated into the optical systems, as shown in FIG. 7.

DISPLAY CORRECTIONS

General

If an aircraft on a radar contour mapping mission were able to maintain an absolutely straight line flight path which (ignoring the earth's curvature) is parallel to the mapping elevation reference plane and if, furthermore, the aircraft were able to maintain a fixed attitude which is further restricted in that the heading corresponds to the direction of flight, then no requirement would exist for making any corrections to the displays discussed previously. Actually, of course, in the presence of winds, gusts, air density differences, and airframe instabilities which result in pitch, roll and yaw oscillations, this ideal condition is rarely encountered. As a result, since it is desired to generate a map which shows targets and contour lines in proper topographic relationship, it is necessary to introduce corrective measures. Some of these, resulting from attitude changes of the aircraft along the flight path, could conceivably be effected through antenna stabilization or through display corrections. Others, such as those resulting from crosswinds or sudden gusts which effect a departure from a straight line flight path, can only be applied to the display itself. The antennas are usually either quite bulky (rotating dish system) or else may be considered permanently fixed with respect to the airframe (electronic scanning systems). In the former case, antenna stabilization is difficult to achieve; in the latter case, it is impossible. Accordingly it seems preferable that all corrections, including those which might be effected by antenna stabilization in an intermediate system, should be applied directly at the displays.

Some of these corrections will be examined below and corresponding implementations will be recommended. The proposed display corrections, taken in combination, should be expected to yield a significant improvement in topographically correct mapping with respect to previous implementations.

Basic film transport speed

When the aircraft heading and ground track lie in the same vertical plane, i.e., there exists neither airframe yaw nor a crosswind component, the film must be transported with a speed proportional to the aircraft's ground velocity. The primary velocity input for film speed control may be derived from a Doppler or other electronic navigation system 61. This input, however, is smoothed since a relatively long time constant integration is applied within the Doppler system. As a result, the effects of gust components in or opposed to the direction of flight and the effects of speed changes due to rapid propulsion variations are not made apparent in the Doppler-derived signal. These effects, however, may be readily sensed with an accelerometer installed so as to sense velocity changes along the longitudinal aircraft axis. It is therefore proposed to derive the basic film transport speed information by a combination of Doppler and accelerometer data as shown in FIG. 9. A weighting network 64 is inserted between the accelerometer 66 and adding network 68 so that velocity changes are sensed in a time-weighted manner. A change in velocity is given full value at the time it actually occurs, but a continuously decreasing value thereafter. With properly chosen time constants for the weighting network 64 with respect to the Doppler integration time, the effect of a velocity change sensed by the accelerometer 66 will complement the Doppler data so that the summation of the two channels produces correct velocity information. Thus, where the new velocity persists after a speed change, the accelerometer 66 supplies the initial change signal. As the Doppler begins to readjust its output, the accelerometer signal is weighted less. By the time the Doppler has stabilized at the new velocity value, accelerometer weighting has been reduced to zero.

Drift angle derivation

The drift angle, whose utilization in display correction is discussed in the following section, is generated in essentially the same fashion as the velocity signal just described. As shown in FIG. 10, the primary signal is derived from the Doppler navigation system 61. Just as was the case for velocity, this signal has been subjected to integration, will not respond to small disturbances, and responds only gradually to any change which is then sustained. Once more, a separate rapid-response sensor 70 is used to detect yaw variations and, in combination with a weighting network 72 and the Doppler-derived signal, to obtain a sum that represents the true instantaneous drift angle.

Compensation for heading and course changes

There exist several possible methods for introducing compensations for aircraft heading and course changes. Three such methods will be discussed briefly in conjunction with specific illustrative examples. In FIG. 11, these examples are denoted in columns by "Case I," "Case II," and "Case III." Case I represents a condition where the aircraft has proceeded along a straight line course, in the direction indicated, in the absence of yaw or any cross-wind component. Upon reaching point A, a cross-wind appears (instantaneously, for the purpose of these illustrations) and remains constant thereafter. The heading of the aircraft remains unchanged but there now exists a drift angle and the aircraft proceeds along a new course (ground track) denoted by G. In Case II, identical wind conditions exist, i.e., no cross-wind initially, followed by continued wind after point A. Here, however, the pilot effects suitable control to maintain flight along the original ground track. The aircraft heading is consequently changed to H'. Case III illustrates a completely windless condition where a deliberate change in course is made upon reaching point A.

The three cases in Row 1 of the figure indicate the aircraft ground tracks as they would appear plotted on a map. In addition, they show some of the lines generated by the contour mapping radar antenna scan. On the ground, these scan lines are always perpendicular to the instantaneous aircraft heading H or H', hence they would appear superimposed on the map as indicated. (For simplicity, flat terrain has been assumed here so that all scan lines cover an identical ground distance.) For reference purposes, a straight road 74 is shown in broken lines parallel to and slightly left of the initial ground track.

The first method of display correction is shown in Row 2 of FIG. 11. This is the method of heading stabilization. Here all traces on the face of the tube are always horizontal and the perpendicular direction to this, which also coincides with the direction of film transport, represents the instantaneous aircraft heading. As a result, on the film record, all scan lines are parallel with each other and are always placed horizontally across the film width. In order to account for drift angles, i.e., differences between the heading and ground track, successive traces are shifted to the left or right until a limiting shift, governed by the extent of the usable tube face area 10, is reached. At this point, the trace is reset, i.e., it is shifted once in the opposite direction. The continuous small trace-to-trace shifts, always in accordance with drift angle, are then resumed. Row 2 of FIG. 11 shows the resulting film records for the three cases, as well as the reassembled film records which are obtained by cutting up the original record at the points of shift discontinuities and assembling the pieces by matching up the outlines of successive strip sections. In addition to this outline matching, it is necessary to orient the film edges always in accordance with the instantaneous heading. This is assumed to be recorded at intervals along the film by readout.

The second method of correction, whose representative film records for the three cases are shown in Row 3, consists of "course stabilization." Here the traces on the tube are horizontal only in the absence of drift. The presence of a drift angle serves to tilt the trace with respect to the horizontal by an amount identical to that angle. The original film records shown in Row 3 may again be cut and reassembled. This reassembly now consists of matching corresponding points of the cut film section and aligning the edges themselves in accordance with the instantaneous ground track direction which is also assumed to be recorded on the film. It may be noted that for Case II, where the pilot successfully maintains the aircraft course in spite of wind changes, and which represents a desired condition in aerial mapping, no cutting of the film record and subsequent reassembly is called for. Instead, the original film record is already in proper map form.

The third and preferred correction method represents a combination of the preceding techniques in a unique manner. Upon establishment of a given course as the reference, lateral shifts of the successive traces are effected in accordance with changes in the ground track. Both course changes and drift angle affect the trace tilt in this case. Specifically, the tilt angle is made equal to the difference between the course change angle and the drift angle. Thus for Case I, where the course change is identical with drift angle, no trace tilt results. In Case II, where there is no course change, the trace tilts by the negative drift angle. In Case III, where drift is zero, the trace tilts in accordance with the course change. Row 4 again shows both the original film records obtained with this method and the reassembled film sections which are put together by aligning corresponding points and by orienting the film edges in the ground track direction.

The method shown in Row 4 eliminates certain disadvantages of the two preceding methods, yet preserves their advantages. Consider Case I, where, in a typical mission, there will exist many short changes in ground course because of wind direction and speed variations. The heading stabilized record (Row 2) will require cutting and reassembly only for prolonged changes where the lateral shifts reach their maximum allowed excursion to the film edge. No cutting is necessary otherwise. The course stabilized record (Row 3) requires cutting and reassembly even for minor course changes. The system of Row 4 here maintains the advantage of Row 2. Considering Case II, course stabilization is superior to heading stabilization since no reassembly is called for in Row 3. Here the system of Row 4 effects a result similar to course stabilization. For Case III, a disadvantage is apparent in both Rows 2 and 3. Specifically, a reassembly is necessary in both instances, yet the film records themselves give no valid clue of this necessity. The only indication of a course change (which may be occurring continuously because of yaw oscillation) is that the apparent direction of the road is changing. If the assembler does not continuously consult the marginal data record, he will not know whether a course change has taken place or whether the road direction did actually change. With the method of Row 4, minor changes are immediately evident yet do not require reassembly. Once more, cutting and reassembly operations are needed only for the extreme lateral excursions of the traces.

Depending upon the specific combination of conditions existing at any one time, changes in course and heading may involve corrections to film transport speed as well as to shift and tilt of the cathode ray tube traces. The film transport speed adjustment is needed whenever the aircraft departs from the reference ground track direction. As the aircraft moves along the ground track with a velocity $v$, as derived from the accelerometer-Doppler system combination of FIG. 9, its apparent speed on the film record should also be proportional to $v$. This is obviously not possible when the ground track does not coincide with the film transport direction and when the film itself is moving at this speed. It is therefore necessary to slow down the film transport so that the vector formed by summing the film motion and lateral trace displacement vectors will be proportional to $v$. This is the case when the film moves at a speed proportional to $v \cos e$ and the trace displacement is proportional to $v \sin e$. The angle $e$ is the difference between the actual and reference ground track directions. Since the actual ground trace may, in turn, be considered the sum of instantaneous heading and instantaneous drift angle, it follows that:

$$e = H + d - G_{REF}$$

where $d$ is the drift angle and $G_{REF}$ is the nominal course. This signal is derived, as shown in FIG. 12, by the following means: The corrected drift angle, obtained by summing the Doppler and accelerometer outputs in the system of FIG. 10, is servoed in the conventional manner to give $d$ in mechanical form. The difference $H - G_{REF}$ is derived from a differential 78, $G_{REF}$ being fed thereinto manually and H being fed thereinto from control transformer 76 the input to which is derived from a navigational compass. To this, the drift angle $d$ is added by means of another differential 80 to yield $e$ in mechanical form. $e$ serves as the input to a resolver 82 which is excited by the velocity signal derived from the combined accelerometer and Doppler system outputs of FIG. 9. One of the resolver outputs is now $v \cos e$ which is the proper quantity for film transport speed control.

The lateral deflection shift, whose shifting rate is to be proportional to $v \sin e$, is derived from the other winding of resolver 82. By using a tachometer 84 for feedback in the $v \sin e$ servo system, the motor 86 is forced to rotate at a speed proportional to $v \sin e$. The motor 86 is connected to a potentiometer 88 whose output, under a condition of continuous rotation, is a sawtooth voltage. Since it is desired to cause a deflection shift in one direction when $e$ is positive but in the opposite direction when it is negative, it becomes necessary to allow $e$ itself to control the polarity of the potentiometer excitation. This is done mechanically with a cam and microswitch arrangement 90 actuated by the output of the differential 80. The resulting signal now has a slope proportional to $v \sin e$ and has proper polarity. When this signal is applied to the horizontal deflection circuitry of the CRT displays, the desired trace shifting and periodic resetting will take place automatically.

The third correction, trace tilting, is achieved most simply by optical means. Dove prisms 92 (see FIGS. 12 and 7), capable of giving continuous rotation to images, are rotated mechanically by one half of the difference between the ground track range and the drift angle. This difference is given by $$(G - G_{REF}) - d = (H + d - G_{REF}) - d = H - G_{REF}$$

This quantity was already computed during the derivation of $e$, above, and is available as the output of differential 78.

*Rapid lateral displacements*

FIG. 13 shows a typical flight path condition caused by a single wind gust which has a component perpendicular to the flight line. In proceeding from A to D, the aircraft experiences a lateral translation in the region B to C. FIG. 13A shows the resulting flight path and the actual ground plane intercepts of representative scan lines. For reference purposes, a straight road 94 is included on the map.

With conventional techniques, the resulting uncompensated film record would have the appearance of FIG. 13B. While the aircraft actually move left in the gust region, the display indicates that the road 94 apparently veered to the right before continuing in the original direction.

A method of compensation and the film record which results when such compensation is utilized are shown in FIGS. 14 and 13C respectively. An integrating accelerometer 96 is mounted to sense the lateral shifts. Its output, representing velocity, is once more integrated at 98 to give a record of the actual position shift. This shift is introduced to the horizontal deflection system. The method of utilizing accelerometer information now differs from those previously discussed in that no time weighting is applied. Assume that one and only one wind gust is experienced. The resulting shift is then maintained thereafter. Unlike previous changes, however, this shift will not be "picked up" by the Doppler system, hence no time weighting can be applied to the accelerometer output. On the other hand, a facility must still be supplied to reset the display horizontally whenever the integrated lateral displacement exceeds the limits permitted by the useful display area on the scope face. For this reason, an amplitude sensing circuit 100 is provided at the horizontal deflection amplifier output. If the total deflection signal (which now represents a combination of antenna sweep position, ground track shift, and gust compensation signals), exceeds a specified maximum excursion in either direction, a zero reset command is generated. This command resets the integrator output. The resulting display shift is no different from the shifts caused by ground track changes. Film reassembly is handled as before. Since a high-speed reset is applied to the electronic integrator 98 and since the integrator can immediately resume its function, no confusion is caused by a gust effect which is sufficiently large to cause the reset to take place. The total gust effect is then the sum of the shifts caused just prior and just after the reset. Since the actual reset time is negligible, the subsequent reassembly will preserve all topographic relations and will properly account for the entire gust effect.

*Altitude compensation*

The need for altitude corrections arises when the aircraft is unable to fly a constant altitude course. Suppose a constant altitude has been maintained over some portion of the flight path. The vertical exaggeration and vertical offset controls 37 and 42 of the display (see FIG. 8) have been set appropriately for the terrain being mapped and a correct contour record has been generated. If the aircraft now experiences a downdraft, for example, then the ranges to the terrain being mapped on a given scan are foreshortened. Since the display tube generates an analog to the actual geometry on the basis of range inputs, an uncompensated display would now indicate that the terrain elevation has increased when it has, in fact, remained constant.

It is therefore necessary to correct the aircraft-terrain analog in a manner which lowers the aircraft position rather than raises the terrain. A target return previously intresecting, say, a red grid line that represents 2000 ft. elevation, should still intersect the same line during and after the downdraft.

The method of altitude compensation shown in FIG. 8 is identical in concept with the methods previously outlined for correcting the Doppler velocity and drift angle outputs. A basic quantity, with inherent smoothing and a slow response to changes, is supplemented by a signal that reflects changes instantly but weights them in accordance with time. The sum of the two signals then represents the actual conditions in existence. For the altitude compensation, the basic signal source is a barometric altimeter 102, itself assumed to be properly compensated for temperature, air density, pressure and aircraft velocity conditions. The rapid changes are sensed by a suitably mounted integrating accelerometer 104, the output of which is appropriately time-weighted at 106. The combined altimeter and weighted accelerometer outputs are applied to the vertical deflection system and result in the desired compensation.

*Other corrections*

If the aircraft 2 should roll, the area scanned by the pencil beam 4 would be different from the area which would have been scanned thereby had the aircraft 2 not moved from its normal orientation. This may be readily compensated for by sensing the roll in any appropriate manner and by causing the input A to the resolver 28 in FIG. 8 to correspond to the sum of the roll angle and the angle which the beam 4 makes relative to the aircraft 2.

Pitch of the aircraft should also be corrected for. Pitch produces two errors. First, it causes the beam 4 to scan a strip 6 either in advance of or behind that which would have been scanned had the aircraft not moved from its normal orientation. Second, because the strip 6 being scanned when the aircraft pitches is no longer directly therebelow, pitch will produce an error in the detected range to the target area illuminated at any given instant.

Shift of the display trace backward or forward relative to the film 21 to compensate for the first pitch error may be accomplished either by controlling the speed of movement of the film 21 or optically displacing the display trace relative to the film 21 through the use of a movable mirror or lens. Range error corrections may be accomplished by electronically appropriately modifying the deflection voltages applied to the cathode ray display tube.

*Scanning in a non-vertical plane*

When, as is disclosed in FIG. 15, the scanning plane is non-vertical, but is instead tilted forward, thus permitting mapping ahead of the vertically projected position of the mapping vehicle, it is possible to eliminate the anamorphic optical system 54, and record directly onto a film or the like in order to produce a contour map representation.

Having reference to FIG. 15, the mapping vehicle, such as an airplane 2, is at the point O and is travelling forward in the direction of the arrow 101 at a height $h_0$ above the horizontal datum plane. Its vertically projected position above that plane is at the point O'. The plane of scan is tilted forward by the angle $\alpha$ and includes the points O, A and B. The scan is to either side of the forward direction and its limits are indicated by the points A, B, the line A, B representing the intersection of the scan plane and the horizontal datum plane. If the terrain being mapped were entirely in the datum plane, the straight line A, B would be the radar trace. When, as is usually the case, the terrain is irregular as indicated by the line 103, the radar trace will be correspondingly irregular.

Consider a point P on the terrain 103. It lies at a slant range R from the point O, and the line of sight 105 thereto makes an angle $\psi$ with the line 107 representing a forward direction from the point O. The coordinates of the point P with respect to the point O' are $x$, $y$ and $h$.

By rather simple trigonometry it can be seen that $x = R \sin \psi$
$y = R \sin \alpha \cos \psi$
$h = h_0 - R \cos \alpha \cos \psi = h_0 - (\cot \alpha) y$ On the cathode ray screen 10, as illustrated in FIG. 16, the terrain profile 103 is traced in the plane of scan precisely as in the previously described embodiment, applying horizontal and vertical deflection sawtooth voltages which are proportional in slope, respectively, to $\sin \psi$ and $\cos \psi$. It follows, since $\alpha$ is constant, that the displayed trace 103' is not only a representation of the terrain profile 103 in the plane of scan, but simultaneously has the shape of the projection of that profile in the horizontal datum plane and in the vertical plane. Thus the point P' on the trace 103' is displayed to the right of the normal and imaginary line 107' at a distance proportional to $x$, is located below the origin O' by a distance proportional to $y$, and is located above the datum intersection line A', B' by a distance proportional to $h$.

With this scanning system, as illustrated in FIGS. 17 and 18, and with the use of a three-color grid for separating the trace 103' into individual display points each representing a different elevation above the datum plane, direct reproduction of contour lines onto a film or the like can be accomplished, and without having to use the anamorphic lens system 54 of the previously described embodiment. Thus, as indicated in FIG. 17, a typical trace 103a is, as in FIGS. 3 and 4, viewed through a mask having translucent or transparent colored grid lens so as to produce a series of points of light 16a representing preselected topographical contour intervals. These points 16a may be projected in any suitable manner onto a film strip 21 which is transported at a rate related to the ground speed of the aircraft and, because of the characteristics of the non-vertical scanning above described, the series of points 16a as reproduced on the traveling film strip 21 will produce, directly, contour mapping lines. When, as is disclosed, the individual points are color-coded the film record will directly indicate whether adjacent contour lines represent increases or decreases in elevation.

CONCLUSION

There has been disclosed a system capable of being carried by a movable mapping station such as an aircraft or ship and effective, directly and substantially instantaneously, to produce an accurate contour map representation from the terrain over which the mapping station moves. Corrections are made in an accurate manner for departures of the movement of the mapping station from a desired norm.

While but a limited number of embodiments of the invention have been here disclosed, it will be apparent that many variations may be made therein, all within the scope of the invention as defined in the following claims.

We claim:
1. The method of forming a contour line display which comprises forming a series of successive profile display images, viewing said images through (a) masking means effective to render visible only portions of said images corresponding to selected height levels and (b) through an anamorphic means effective to collapse said profile display images into substantially straight line traces, and successively recording next to one another the portions of successive images viewed via said masking means and said anamorphic means.

2. The method of claim 1, in which said masking means comprises means for causing image portions viewed therethrough and representing different height levels to have optically different characteristics, thereby to facilitate identification of the particular height level represented by a given image portion.

3. The method of claim 1, in which said masking means comprises means for causing image portions viewed therethrough and representing each successive set of a plurality of consecutive selected height levels to have optical characteristics differing according to a predetermined cycle, thereby to facilitate identification of the particular height level represented by a given image portion.

4. The method of forming a contour line display which comprises forming a series of successive profile display images on a screen, target height being shown vertically and target lateral displacement being shown horizontally, viewing said screen through (a) masking means effective to render visible only vertically spaced and horizontally extended strip portions of said screen corresponding to selected height levels and (b) through an optical means which retains the horizontal displacement but eliminates the vertical displacement of the visible portions of said images, and successively recording next to one another the portions of successive images viewed via said masking means and said optical means.

5. The method of claim 4, in which said masking means comprises means for causing image portions viewed therethrough and representing different height levels to have optically different characteristics, thereby to facilitate identification of the particular height level represented by a given image portion.

6. The method of claim 4, in which said masking means comprises means for causing image portions viewed therethrough and representing each successive set of a plurality of consecutive selected height levels to have optical characteristics differing according to a predetermined cycle, thereby to facilitate identification of the particular height level represented by a given image portion.

7. The method of forming a contour line map display of an area to be mapped from a mapping station movable across said area, which comprises scanning strips of said area from said mapping station with radiated energy as said mapping station moves across said area, receiving signals corresponding to radiated energy reflected from said area strips, forming on a screen from said signals a series of successive display images corresponding to the profiles of the successively scanned strip areas, viewing said images through (a) masking means effective to render visible only portions of said screen corresponding to selected height levels and (b) through an anamorphic means effective to collapse said profile display images into substantialy straight line traces, and successively recording next to one another the portions of successive images viewed via said masking means and said anamorphic means.

8. The method of claim 7, in which said masking means comprises means for causing image portions viewed therethrough and representing different height levels to have optically different characteristics, thereby to facilitate identification of the particular height level represented by a given image portion.

9. The method of claim 7, in which said masking means comprises means for causing image portions viewed therethrough and representing each successive set of a plurality of consecutive selected height levels to have optical characteristics differing according to a predetermined cycle, thereto to facilitate identification of the particular height level represented by a given image portion.

10. In the method of claim 7, means for maintaining the intensity of said profile display images substantially constant independently of variations in the intensity of the received signals, and means for forming and recording a second series of display images synchronized with the formation and recording of said first mentioned series of display images, the images of said second series being vertically collapsed in a manner similar to that of said first series of images but with the intensity of given points thereon varying in accordance with the intensity of the received signals corresponding thereto.

11. In the method of claim 7, means for sensing the height of said mapping station above a reference plane and for adjusting the location of said profile display image in accordance therewith.

12. In the method of claim 11, means for deriving a first correcting signal corresponding to slow changes in height of said mapping station, means for deriving a second correcting signal corresponding to rapid changes in such height, means for combining said first and second signals in predetermined weighted relationship relative to time to produce a third signal, and means for adjusting the location of said profile display image in accordance with said third correcting signal.

13. In the method of claim 7, means for sensing departures in the movement of said mapping station from a predetermined norm and correcting said display image therefor, said means comprising means for deriving a first correcting signal corresponding to slow departures from said norm, means for deriving a second correcting signal corresponding to rapid departures from said norm, means for combining said first and second signals in predetermined weighted relationship relative to time to produce a third signal, and means for correcting said display image in accordance with said third correcting signal.

14. In the method of claim 7, the improvement which comprises sensing the drift angle and course of said station, shifting said straight line traces laterally in accordance with sensed departures of the course of said station from a predetermined norm, and simultaneously shifting the inclination of said traces in accordance with the difference between (a) the departure of the course of said station from said norm and (b) the drift angle of said mapping station.

15. The method of forming a contour line map display of an area to be mapped from a mapping station movable across said area, which comprises scanning strips of said area from said mapping station with radiated energy as said mapping station moves across said area, receiving signals corresponding to radiated energy reflected from said area strips, forming from said signals a series of successive display images corresponding to the profiles of successively scanned strip areas, viewing said images through (a) masking means effective to render visible only portions of said screen corresponding to selected height levels and (b) through an anamorphic means effective to collapse said profile display images into substantially straight line traces, and successively recording next to one another the portions of successive images viewed via said masking means and said anamorphic means on a recording medium moving at a speed corresponding to the speed of movement of said station over said area.

16. The method of forming a contour line map display of an area to be mapped from a mapping station movable across said area, which comprises scanning strips of said area from said mapping station with radiated energy as said mapping station moves across said area, receiving signals corresponding to radiated energy reflected from said area strips, forming on a screen, from said signals, a series of successive display images corresponding to the profiles of successively scanned strip areas, target height being shown vertically and target lateral displacement being shown horizontally, viewing said screen through (a) masking means effective to render visible only vertically spaced and horizontally extended strip portions of said screen corresponding to selected height levels and (b) through an optical means which retains the horizontal displacement but eliminates the vertical displacement of the visible portion of said images, and successively recording next to one another the portions of successive images viewed via said masking means and said optical means.

17. The method of claim 16, in which said masking means comprises means for causing image portions viewed therethrough and representing different height levels to have optically different characteristics, thereby to facilitate identification of the particular height level represented by a given image portion.

18. The method of claim 16, in which said masking means comprises means for causing image portions viewed there-through and representing each successive set of a plurality of consecutive selected height levels to have optical characteristics differing according to a predetermined cycle, thereto to facilitate identification of the particular height level represented by a given image portion.

19. The method of forming a contour line map display of an area to be mapped from a mapping station movable across said area, which comprises scanning strips of said area from said mapping station with radiated energy as said mapping station moves across said area, receiving signals corresponding to radiated energy reflected from said area strips, forming on a screen, from said signals, a series of successive display images corresponding to the profiles of successivly scanned strip areas, target height being shown vertically and target lateral displacement being shown horizontally, viewing said screen through (a) masking means effective to render visible only vertically spaced and horizontally extended strip portions of said screen corresponding to selected height levels and (b) through and optical means which retains the horizontal displacement but eliminates the vertical displacement of the visible portions of said images, and successively recording next to one another the portions of successive images viewed via said masking means and said optical means on a recording medium moving at a speed corresponding to the speed of movement of said station over said area.

20. In a method of mapping from a mapping station moving over the area to be mapped which comprises successively scanning strips of said area with energy radiated from said mapping station, said strips having a predetermined directional relationship to the heading of said mapping station, receiving signals at said station corresponding to received reflected energy, and successively forming map strips of sensible indications corresponding to said signals; the improvement which comprises sensing the drift angle and course of said station, shifting said map strips laterally in accordance with sensed departures of the course of said station from a predetermined norm, and simultaneously shifting the inclination of said map strips in accordance with the difference between (a) the departure of the course of said station from said norm and (b) the drift angle of said station.

21. In a method of mapping from a mapping station moving over the area to be mapped which comprises successively scanning strips of said area with energy radiated from said mapping station, receiving signals at said station corresponding to receive reflected energy, and producing mapping indications in accordance with said signals; the improvement which comprises means for sensing departures in the movement of said mapping station from a predetermined norm and correcting said mapping indications therefor, said means comprising means for deriving a first correcting signal corresponding to slow departures from said norm, means for deriving a second corresponding signal corresponding to rapid departures from said norm, means for combining said first and second signals in predetermined weighted relationship relative to time to produce a third signal, and means for correcting said mapping indications in accordance with said third signal.

22. In a method of forming a contour line display, the steps which comprise forming a series of successive profile display images and viewing said images through masking means effective to render visible only portions of said images corresponding to selected height levels, there by to derive height-related image portions capable of being subsequently recorded.

23. The method of claim 22, in which said masking means comprises means for causing image portions viewed therethrough and representing different height levels to have optically different characteristics, thereby to facilitate identification of the particular height level represented by a given image portion.

24. The method of claim 22, in which said masking means comprises means for causing image portions viewed therethrough and representing each successive set of a plurality of consecutive selected height levels to have optical characteristics differing according to a predetermined cycle, thereby to facilitate identification of the particular height level represented by a given image portion.

25. In a method of forming a contour line display, the steps which comprise forming a series of successive profile display images on a screen, target height being shown vertically and target lateral displacement being shown horizontally, and viewing said images through masking means effective to render visible only vertically spaced and horizontally extended strip portions of said screen corresponding to selected height levels, thereby to derive height-related image portions capable of being subsequently recorded.

26. The method of claim 25, in which said masking means comprises means for causing image portions viewed therethrough and representing different height levels to have optically different characteristics, thereby to facilitate identification of the particular height level represented by a given image portion.

27. The method of claim 25, in which said masking means comprises means for causing image portions viewed therethrough and representing each successive set of a plurality of consecutive selected height levels to have optical characteristics differing according to the predetermined cycle, thereby to facilitate identification of the particular height level represented by a given image portion.

28. In a method of forming a contour line display of an area to be mapped from a mapping station movable across said area, the steps which comprise scanning strips of said area from said mapping station with radiated energy as said mapping station moves across said area, receiving signals corresponding to radiated energy reflected from said area strips, forming on a screen from said signals a series of succesive display images corresponding to the profiles of the succesively scanned strip areas, and viewing said images through masking means effective to render visible only portions of said screen corresponding to selected height levels, thereby to derive height-related image portions capable of being subsequently recorded.

29. The method of claim 28, in which said masking means comprises means for causing image portions viewed therethrough and representing different height levels to have optically different characteristics, thereby to facilitate identification of the particular height level represented by a given image portion.

30. The method of claim 28, in which said masking means comprises means for causing image portions viewed therethrough and representing each successive set of a plurality of consecutive selected height levels to have optical characteristics differing according to a predetermined cycle, thereby to facilitate identification of the particular height level represented by a given image portion.

31. A method of forming a contour line display of an area to be mapped from a mapping station movable across said area, which comprises scanning strip of said area from said mapping station as said mapping station moves across said area, said scanning occurring in a non-vertical plane, receiving signals corresponding to radiated energy reflected from said area strips, forming on a screen from said signals a series of successive display images corresponding to the profiles of the successive scanned strip areas, viewing said images through masking means effective to render visible only portions of said screen corresponding to selected height levels, and successively recording next to one another the portions of successive images viewed via said masking means.

32. The method of claim 31, in which said masking means comprises means for causing image portions viewed therethrough and representing different height levels to have optically different characteristics, thereby to facilitate identification of the particular height level represented by a given image portion.

33. The method of claim 31, in which said masking means comprises means for causing image portions viewed therethrough and representing each successive set of a plurality of consecutive selected height levels to have optical characteristics differing according to a predetermined cycle, thereby to facilitate identification of the particular height level presented by a give image portion.

34. A method of forming a contour line display of an area to be mapped from a mapping station movable across said area, which comprises scanning strips of said area from said mapping station as said mapping station moves across said area, said scanning occurring in a non-vertical plane, receiving signals corresponding to radiated energy reflected from said area strips, forming on a screen from said signals a series of successive display images corresponding to the profiles of the successively scanned strip areas, viewing said images through masking means effective to render visible only portions of said screen corresponding to selected height levels, and successively recording next to one another, on a recording medium moving at a speed corresponding to the speed of movement of said station over said area, the portions of successive images viewed via said masking means.

35. The method of claim 34, in which said masking means comprises means for causing image portions viewed therethrough and representing different height levels to have optically different characteristics, thereby to facilitate identification of the particular height level represented by a given image portion.

36. The method of claim 34, in which said masking means comprises means for causing image portions viewed therethrough and representing each successive set of a plurality of consecutive selected height levels to have optical characteristics differing according to a predetermined cycle, thereby to facilitate identification of the particular height level represented by a given image portion.

References Cited by the Examiner
UNITED STATES PATENTS

| | | | |
|---|---|---|---|
| 2,616,077 | 10/52 | Holser | 343—5 |
| 2,845,620 | 7/58 | Hammond et al. | 343—5 |
| 2,930,035 | 3/60 | Altekruse | 343—7 |
| 3,007,155 | 10/61 | Petrides et al. | 343—5 |
| 3,109,169 | 10/63 | Snyder | 343—5 |

KATHLEEN H. CLAFFY, *Primary Examiner.*

CHESTER L. JUSTUS, *Examiner.*